Jan. 13, 1959 E. J. VOSLER ET AL 2,867,898
METHOD OF MANUFACTURING A BRAKE BAND
Filed June 28, 1954 7 Sheets-Sheet 1
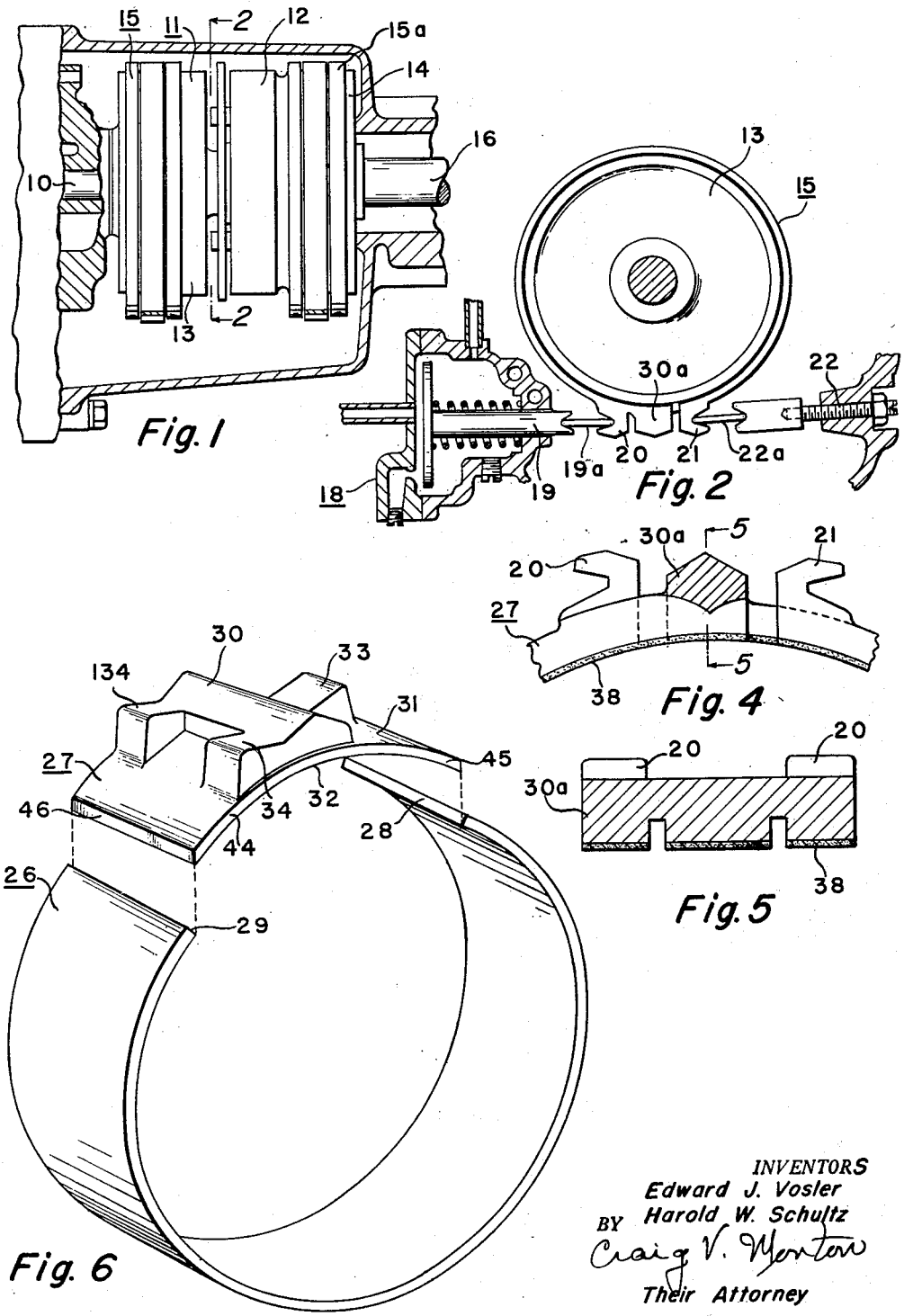
INVENTORS
Edward J. Vosler
Harold W. Schultz
BY
Craig V. Morton
Their Attorney Jan. 13, 1959  E. J. VOSLER ET AL  2,867,898
METHOD OF MANUFACTURING A BRAKE BAND
Filed June 28, 1954  7 Sheets-Sheet 2

INVENTORS
Edward J. Vosler
BY Harold W. Schultz
Craig V. Montow
Their Attorney

Jan. 13, 1959        E. J. VOSLER ET AL        2,867,898
METHOD OF MANUFACTURING A BRAKE BAND
Filed June 28, 1954        7 Sheets-Sheet 3

1. FORM CYLINDER BAND FROM STRIP STOCK AND CUT ENDS RADIALLY TO LENGTH LEAVING OPEN SEGMENT.

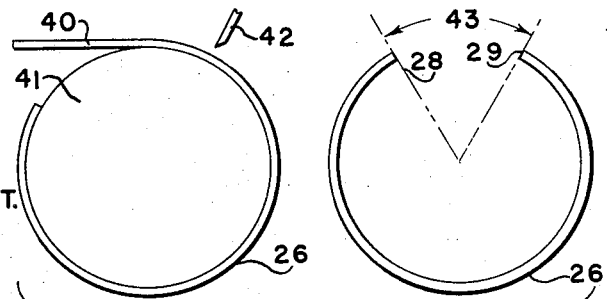

Fig. 7

2. FORGING SEGMENT TRIMMED TO WIDTH AND LENGTH. ENDS MACHINED PARALLEL.

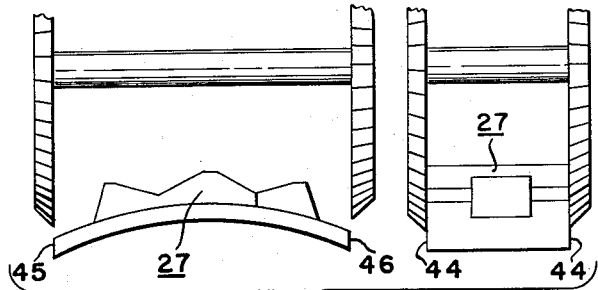

Fig. 8

3. FORGING SEGMENT PLACED IN OPEN SEGMENT OF BAND. ENDS WELDED.

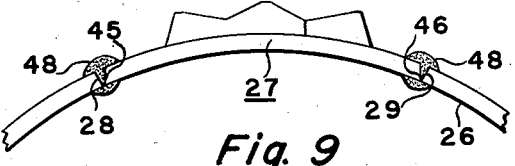

Fig. 9

4. SCARF OFF WELD FLASH.

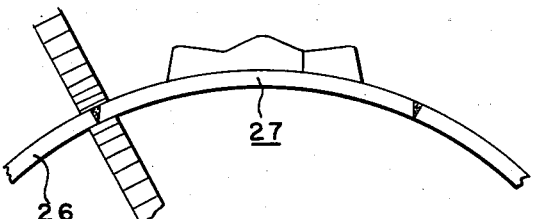

Fig. 10

INVENTORS
Edward J. Vosler
BY Harold W. Schultz
Craig V. Morton
Their Attorney

Jan. 13, 1959    E. J. VOSLER ET AL    2,867,898
METHOD OF MANUFACTURING A BRAKE BAND
Filed June 28, 1954    7 Sheets-Sheet 4

5. STRETCH BAND TO SIZE AND SHAPE.

6. BROACH SLOTS TO DEPTH OF BAND AND BROACH "V" SLOTS.

INVENTORS
Edward J. Vosler
BY Harold W. Schultz

Craig V. Morton
Their Attorney

Jan. 13, 1959    E. J. VOSLER ET AL    2,867,898
METHOD OF MANUFACTURING A BRAKE BAND
Filed June 28, 1954    7 Sheets-Sheet 5

7. PIERCE OPENINGS IN BOTTOM WALLS OF BROACHED SLOTS.

8. BOND FRICTION LINING TO INNER SURFACE.

9. PIERCE OPENINGS IN FRICTION MATERIAL

INVENTORS
Edward J. Vosler
Harold W. Schultz
BY Craig V. Morton
Their Attorney

Jan. 13, 1959     E. J. VOSLER ET AL     2,867,898
METHOD OF MANUFACTURING A BRAKE BAND
Filed June 28, 1954     7 Sheets-Sheet 6
10. BORE OUT FRICTION LINING TO SIZE.
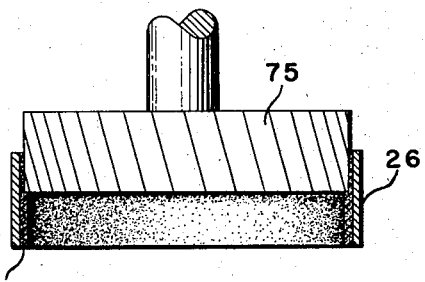
Fig. 16
11. GROOVE FRICTION LINING.
Fig. 17
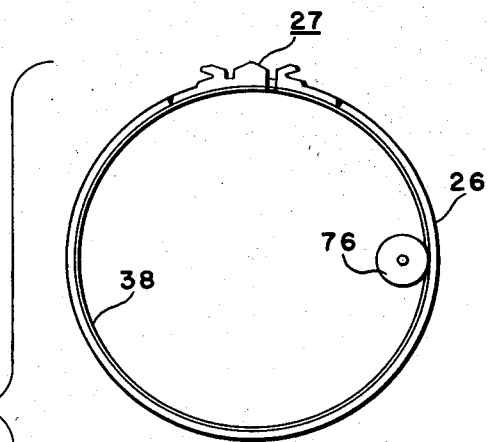
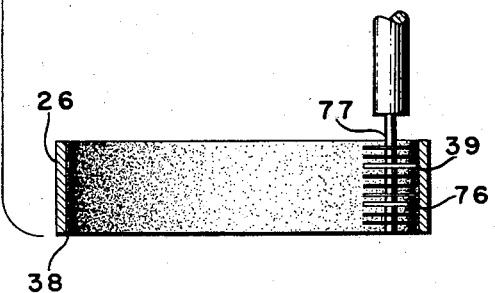
INVENTORS
Edward J. Vosler
Harold W. Schultz
BY
Craig V. Menton
Their Attorney Jan. 13, 1959  E. J. VOSLER ET AL  2,867,898
METHOD OF MANUFACTURING A BRAKE BAND
Filed June 28, 1954  7 Sheets—Sheet 7

12. SLIT BAND LONGITUDI-
NALLY AND FINISH
TRIM SIDES TO SIZE

INVENTORS
Edward J. Vosler
BY Harold W. Schultz

Craig V. Morton
Their Attorney

United States Patent Office 2,867,898
Patented Jan. 13, 1959

2,867,898
METHOD OF MANUFACTURING A BRAKE BAND

Edward J. Vosler and Harold W. Schultz, Dayton, Ohio, assignors to General Motors Corporation, Detroit, Mich., a corporation of Delaware Application June 28, 1954, Serial No. 439,578

10 Claims. (Cl. 29—416)

This invention relates to the method of manufacturing friction bands or brake bands. More specifically the invention relates to a method of manufacturing a friction band adapted for substantially double encirclement of a drum. A friction band or brake band of this type can be termed a double wrap band.

An object of the invention is to provide a method of manufacturing a friction band or brake band constructed in accordance with the foregoing objects.

Another object of the invention is to provide a method of manufacturing a double wrap friction or brake band of the kind referred to in the aforementioned objects wherein the band is composed of two primary elements, one of which is a cylindrical strap or band having an open segment in which a preformed forging or casting is inserted with the free ends of the band being bonded, or welded, to the free ends of the forging or casting segment, the band so formed being thereafter processed to sever the band longitudinally into three substantially coextensive ribbons interconnected by an inflexible bar.

Further objects and advantages of the present invention will be apparent from the following description, reference being had to the accompanying drawings wherein a preferred form of the invention is clearly shown.

Figure 1 is a cross sectional view of a part of an automatic transmission for a motor vehicle illustrating the use of the friction band or brake band of this invention.

Figure 2 is a cross sectional view along line 2—2 of Figure 1 but illustrating schematically certain controls and adjustments for the brake band.

Figure 4 is a cross sectional view taken along line 4—4 of Figure 3.

Figure 5 is a cross sectional view taken along line 5—5 of Figure 4.

Figure 6 is a perspective elevational view of the components from which the brake band of Figure 3 is manufactured.

Figure 3:
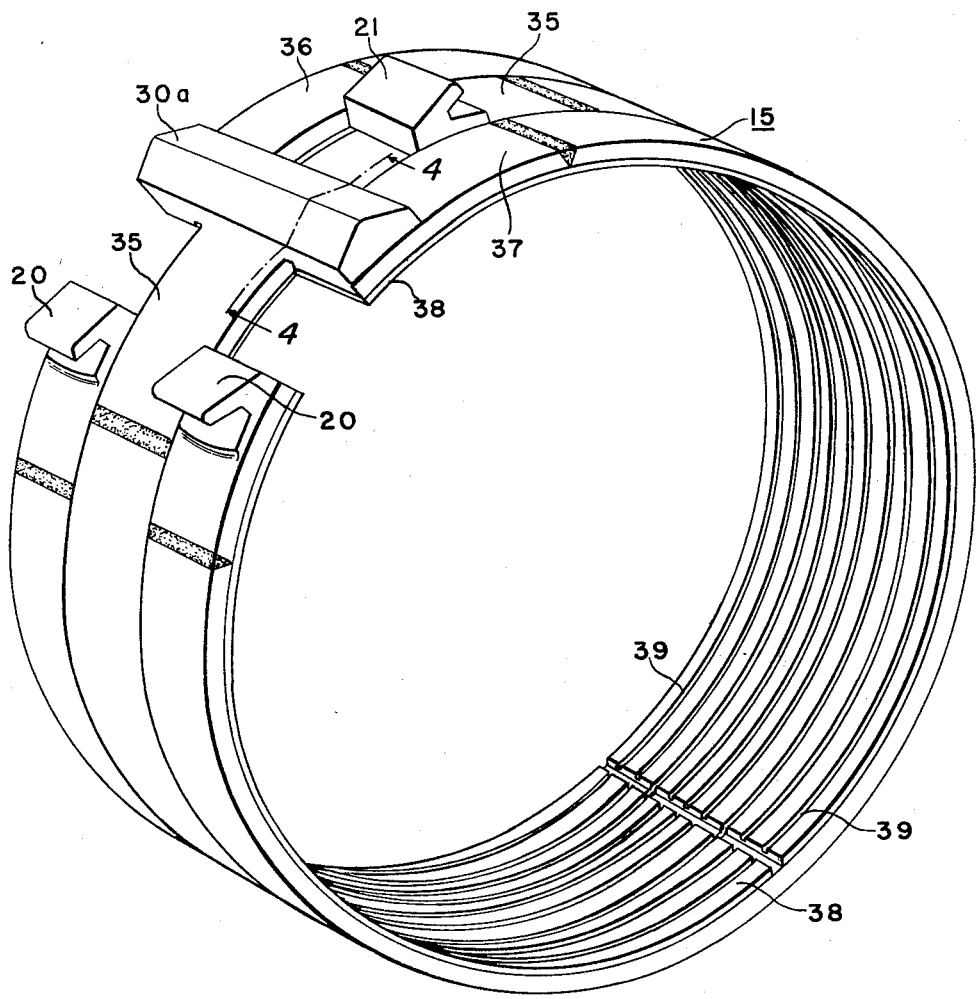
Figure 3 is a perspective elevational view of a brake band produced in accordance with the method of this invention.

Figures 7–18 inclusive illustrate schematically the several steps in the method of manufacturing the friction or brake band of Figure 3.

The double wrap friction or brake band illustrated in Figure 3 is adapted for use in an automatic transmission schematically illustrated in Figures 1 and 2. In the conventional automatic transmission of the torque converter type there is provided a driven shaft 10 that extends from the torque converter of the fluid coupling type that is commonly known in the art today. Since the torque converter forms no part of this invention it is not illustrated or described.

The driven shaft 10 extends into a clutch and planetary unit comprising the clutch assembly 11 and a planetary assembly 12. The clutch assembly includes a clutch drum 13 around which there is placed a brake band 15 of the type of this invention. The planetary assembly 12 also includes a drum 14 around which there is placed a similar brake band 15a.

The brake bands 15 and 15a are contractable radially into engagement with the respective drums 13 and 14 to effect non rotation of these drums and thereby effect certain speed changes in the output shaft 16 or reverse rotation change to obtain operation under a low gear condition or for reversing but since the clutch unit and planetary unit per-se form no part of the invention they are not disclosed or described specifically. It is merely the function of the brake bands 15 and 15a under suitable hydraulic controls to effect gear change and control of the direction of rotation of the output or drive shaft 16.

In Figure 2 there is illustrated schematically a control for the brake band 15 for contracting it upon the drum 13. The control comprises a hydraulically actuated motor 18 which upon receipt of fluid under pressure moves the plunger 19 in a right hand direction against the connecting lugs 20, more specifically shown in Figure 3. The connecting lug 21, also shown in Figure 3, is held stationary by an adjusting device 22 for regulating the clearance between the drum 13 and the brake band 15.

The brake bands 15 and 15a of Figure 1 are constructed in accordance with that illustrated in Figure 3 in their finished manufactured form. The brake band of Figure 3 is composed primarily of two elements illustrated in Figure 6, these elements being a cylindrically shaped steel band or strap 26 and a preformed forging or casting 27. The band or strap 26 is not a complete cylinder but has an open segment forming the ends 28 and 29. The forging or casting 27 forms a segment to close the open segment of the cylindrical band or strap 26 when the forging is placed between the ends 28 and 29 of the strap 26 and is bonded or welded thereto in a manner hereinafter described.

The forging or casting 27 comprises a segment portion 31 that is of substantially the same cross sectional thickness as that of the band or strap 26. The inner peripheral surface 32 of the segment 27 coincides with and completes the inner periphery of the cylinder formed by the strap or band 26. The outer peripheral surface of the segment 27 is provided with a boss 30 that extends transversely of the segment 27 and of the cylinder 26 and is parallel to the axis of the cylinder formed by the band or strap 26. This boss 30 forms the bar or inflexible connection 30a of the finished brake band illustrated in Figure 3.

On one side of the boss 30 there is provided a raised boss or lug 33. On the opposite side of the boss 30 there is provided the raised bosses or lugs 34 and 134, the lugs 34 and 134 being adjacent opposite ends of the boss 30 while the lug 33 is intermediate of the ends of the boss 30. The bosses 34 and 134 provide the connecting lugs 20 while the boss 33 provides a connecting lug 21 of the manufactured article as shown in Figure 3.

The friction or brake band of Figure 3 comprises an inflexible bar 30a from one side of which there extends a radially flexible ribbon 35 that is an integral part of the bar 30a and unitized therewith. The opposite end of the ribbon 35 carries the connecting lug 21. Also, the ribbon 35 is disposed intermediate opposite ends of the inflexible bar 30a. From the opposite side of the inflexible bar 30a there extends the radially flexible ribbons 36 and 37 that are an integral part of and are unitized with the bar 30a. These ribbons 36 and 37 extend substantially coextensively with the ribbon 35 with the opposite ends of the ribbons 36 and 37 carrying the lugs 20.

It will be noted that the central ribbon 35 extends from the side of the bar 30a from which the free ends of the ribbons 36 and 37 are disconnected and the ribbons 36 and 37 extend from the opposite side of the bar 30a from which the free end of the central ribbon is disconnected.

When the actuating device 19 through the links 19a engages the lugs 20 and tends to contract the brake band 15 upon the drum 13, the force applied will be directly opposite to the force applied through the stationary adjusting device 22 engaging the lug 21 through the link 22a. Thus the compressive forces for contacting the band are diametrically opposite so that there is no torque created in the brake band 15 that is angular to the axis of the band which would be imparted to the drum 13 tending to rotate the drum on its axis. The arrangement provides for more consistent operation of the clutch and planetary units of the automatic transmission.

The brake band 15 shown in Figure 3 is provided with a layer of friction material 38 that has the annular grooves 39 provided therein. The finished brake band illustrated in Figure 3 is in effect a one piece structure with the outer ribbons 36 and 37 being inflexibly connected with the inner ribbon 35 through the inflexible connecting bar 30a.

To manufacture this one piece brake band, the method of manufacture schematically set forth in Figures 7–18 inclusive is followed.

The cylindrical band or strap 26 of Figure 6, from which the ribbons 35, 36 and 37 are formed, is first formed into a cylindrical band from a long length of strip stock and is then cut to a predetermined length. This operation is illustrated in Figure 7 wherein the strip steel stock 40 is wound upon a mandrel 41. Upon a predetermined length of the strip stock 40 being wound upon the mandrel 41, the severing tool 42 cuts the strip to length thereby forming a strap or band 26 of predetermined diameter and of predetermined length. The diameter of the band 26 is such that the ends are spaced from one another and form the open segment 43. The ends 28 and 29 of the band 26 are cut radially for reasons hereinafter described.

The forging segment 27 which has been preformed in any suitable manufacturing operation has the parallel side edges 44 trimmed to effect a predetermined width to the segment. Also, the ends 45 and 46 of the forging segment 27 are trimmed parallel to one another.

The forging segment formed according to the illustration of Figure 8 is now in the step of the method illustrated in Figure 9 placed within the open segment of the band 26 with the ends 45 and 46 of the segment 27 disposed adjacent the ends 28 and 29 respectively of the strap 26, as shown in Figure 9. The radial trimming of the ends of the strap or band 26 and the parallel trimming of the ends of the segment 27 provide V grooves between the adjacent ends to form a suitable groove opening to receive welding material 48 thereby butt welding the ends of the segment 27 to the ends of the strap 26 to form thereby a complete cylindrical strap or band.

Following the butt welding of the segment 27 into the open segment of the band 26, the excess welding material at the weld joint between the parts is cut off by a scarfing operation, as shown in Figure 10.

Figure 11:
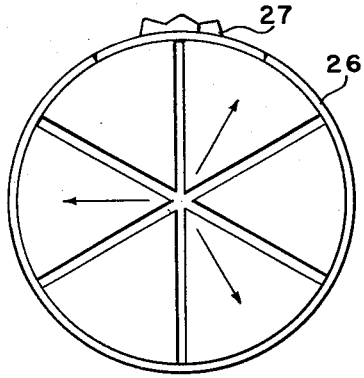

Following the scarfing operation illustrated in Figure 10, the unitized band, comprising the segment 27 and the band 26, is then placed upon a stretching fixture to expand the band beyond its normal elastic limit so as to effect a set in the band, thereby giving it a predetermined size and shape, in this instance cylindrical, as shown in Figure 11.

Figure 12:
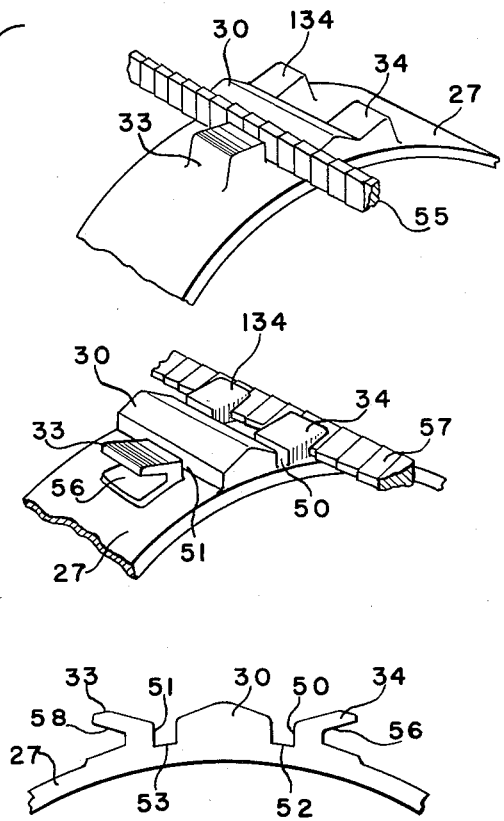

In preparing the band shown in Figure 11 to obtain separation of the band into the three radially expansible ribbons illustrated in Figure 3, the next step in the process of manufacture comprises effecting a slot 50 between the boss 30 and the lugs 34 and 134 as well as effecting a corresponding slot 51 between the lug 33 and the opposite side of the boss 30. These slots 50 and 51 extend transversely of the segment 27, now unitized with the band 26 and are of a depth such that the bottom walls 52 and 53 of the respective slots are on substantially the same peripheral circle as the outer periphery of the band 26. The slots 50 and 51 may be effected between the boss 30 and the respective lugs 34, 134 and the lug 33 by means of a suitable broaching tool 55, as shown in Figure 12.

Concurrently with the broaching of the slots 50 and 51 the lugs 34 and 134, which are now separated from the boss 30 by the slot 50, are each provided with a V notch 56 by suitable broaching tool 57. Similarly, the lug 33, now separated from the boss 30 by the notch 51 is provided with a V notch 58.

Figure 13:
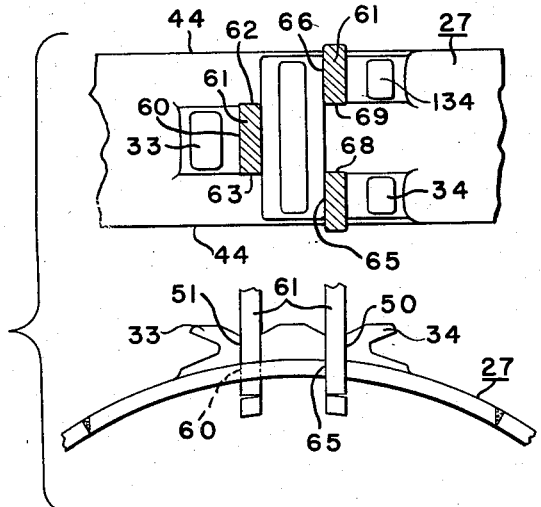
Figure 14:
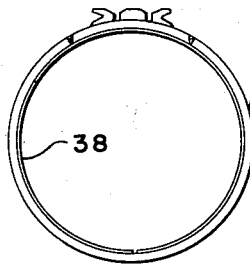

In Figure 13 there is illustrated the next step in the method of manufacture by which the unitized band is prepared for severing it into the several ribbons as illustrated in Figure 3. In this step of the manufacturing operation an opening 60 is pierced through the bottom wall of the slot 51 by means of a suitable piercing or punching tool 61. This opening 60 is substantially longitudinally aligned with the lug 33 and has its opposite ends 62 and 63 positioned inwardly from the edges 44 of the segment 27, as shown in Figure 13.

Concurrently with placing of the opening 60 in the bottom of the slot 51, openings 65 and 66 are placed in each of opposite edges of the segment 27, these openings being in the bottom wall of the slot 50 and extending inwardly from the edges 44 of the segment 27. The inner ends 68 and 69 respectively of the openings 65 and 66 are aligned longitudinally with the ends 63 and 62 respectively of the opening 60. That is, the ends of opening 60 are linearly in alignment with the inner ends of the openings 65 and 66.

Figure 15:
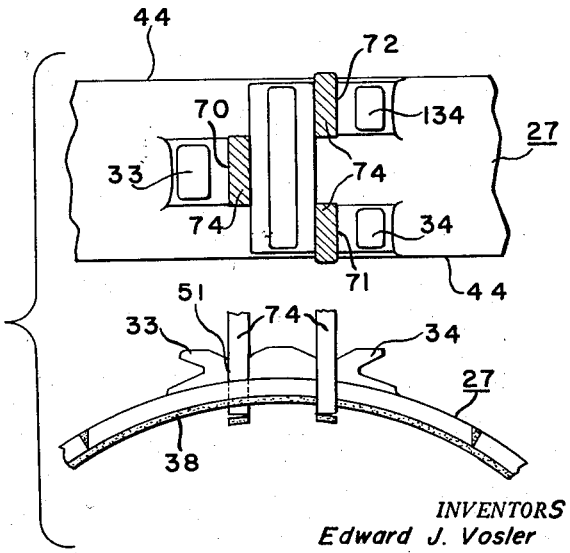

Subsequent to piercing of the openings just described in Figure 13 a layer of friction lining material 38 is bonded to the inner peripheral surface of the thus formed unitized band. This operation causes the lining to pass over the openings that were pierced in the operation illustrated in Figure 13. Subsequently, as illustrated in Figure 15, openings 70, 71 and 72 are pierced in the friction lining material 38 in the same manner as the openings were pierced as described with reference to the step illustrated in Figure 13, the openings in the lining layer 38 being coextensive with the openings in the segment 27. Suitable punches 74 perform the aforementioned operation in the step of manufacture illustrated in Figure 15.

In Figure 16 there is illustrated the step of manufacture of sizing the internal periphery of the lining 38 that has been placed within the band 26. This can be accomplished by a boring tool 75 or any suitable similar operation.

In Figure 17 there is illustrated the step in the manufacture of the band of Figure 3 of placing the annular grooves 39 in the face of the lining 38. This can be accomplished by placing a plurality of milling cutters 76 on a common spindle 77 and rotating the cutters about the periphery of the lining 38 to cut the grooves 39 simultaneously to a predetermined depth with the grooves being spaced one from the other transversely of the band according to any predetermined dimensions.

Up to this point in the manufacture of the brake band of Figure 3, the band has been a cylindrical member of one piece construction so that all the dimensions produced in the several operations can be accurately maintained and the band be handled as a single unitary article.

The final step in the method of manufacture of the brake band illustrated in Figure 3 is that step by which the band is severed or slit longitudinally around its periphery to produce the three radially expansible ribbons 35, 36 and 37 interconnected by the inflexible bar 30a. In this step of manufacture, illustrated in Figure 18, a pair of milling cutters 80 and 81 are mounted on a spindle 82. The milling cutters 80 and 81 are spaced from one another so that they will be planarly aligned with the linearly aligned ends of the opening 60 and the openings 65 and 66. As the milling cutters rotate around the periphery of the band 15, longitudinal slits are effected beginning from one side of the boss 30 to the opposite side thereof. As shown in the method step of Figure 18, the milling cutter starts from a position "A" shown in dotted lines and proceeds in a clockwise direction around the band to slit the band longitudinally. The milling cutter stops at a position "B" shown in dot-dash lines and is then moved toward the axis of the band to stop the slitting operation. It will be seen that the slitting performed by the milling cutters is of a depth at least equal to the cross sectional thickness of the band and the slits formed by the milling cutters effect slots through the boss 30 in the inner peripheral side thereof that are of a depth at least equal to the cross sectional thickness of the band. This slotting of the inner periphery of the boss 30 does not sever the boss but rather that portion above the outer peripheral surface of the band is the portion that provides the inflexible connecting bar that interconnects the central ribbon 35 with the outer ribbons 36 and 37.

It will be appreciated that the method steps heretofore described in the manufacture of the brake band illustrated in Figure 3 can be combined in various ways, or each can be a completely independent step in the method of manufacture. Also, the sequence of the steps can be changed somewhat, but in no event can the slitting operation of the step of Figure 18 be performed before all of the other machining operations required for the band are completed as it is the purpose of the invention that all of the machining operations be performed on the band as a unitary structure to maintain manufacturing dimensions within predetermined tolerances. Then after the machining tolerances have been established on the one piece band, it can then be slit into a three ribbon band by the method step illustrated in Figure 18.

Figure 18:
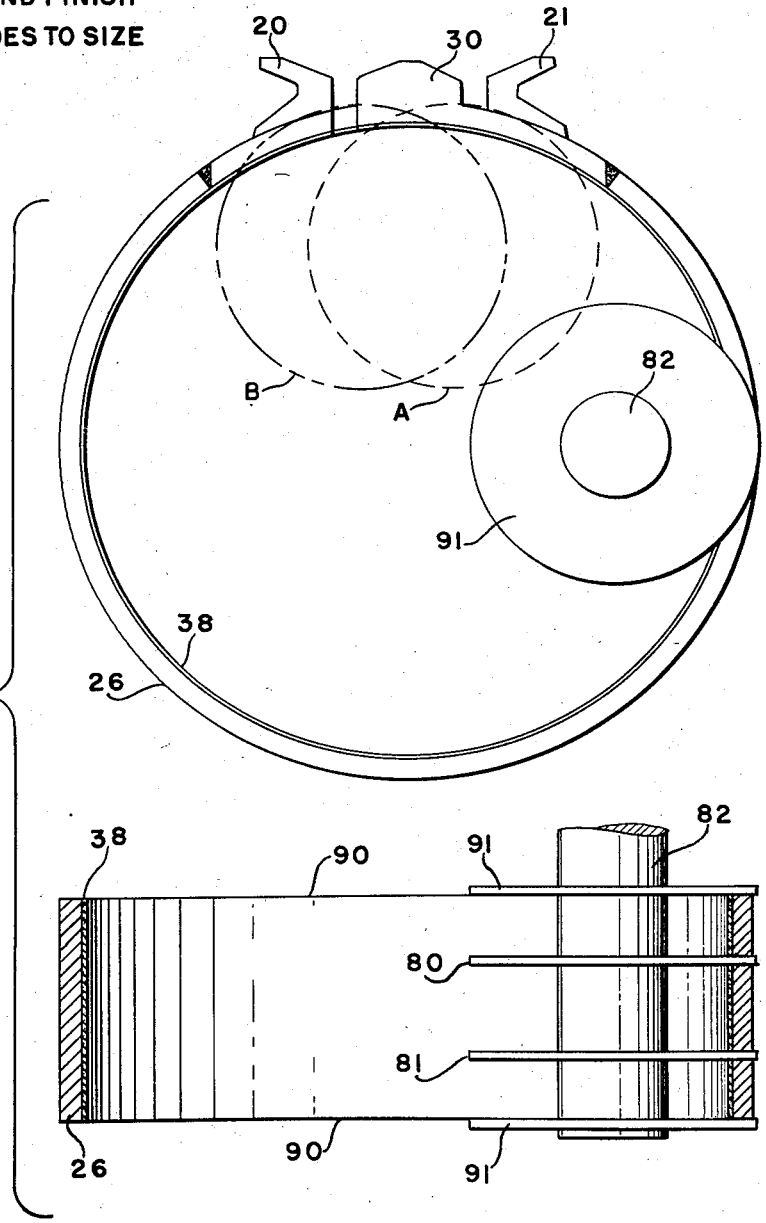

Simultaneously with slitting of the band as heretofore described, the edge surfaces 90 of the band are milled to finished size by the milling cutters 91, shown in Figure 18. Thus, the slitting operation heretofore described and the machining of the band to width of predetermined dimension is performed simultaneously.

While the form of embodiment of the invention as herein disclosed constitutes a preferred form, it is to be understood that other forms might be adopted as may come within the scope of the claims which follow.

What is claimed is as follows:

1. The method of manufacturing a brake band adapted for double encirclement of a drum in the same direction of rotation wherein the band includes a cylindrical central ribbon disposed between coextensively extending cylindrical outer ribbons with one end of the central ribbon unitized with one side of an inflexible connecting bar and the opposite side of the central ribbon disconnected from the bar and one end of each of the outer ribbons unitized with the side of the bar from which the central ribbon is disconnected and the opposite end disconnected from the side of the bar with which the central ribbon is connected, said method comprising, arranging a metal strap into a substantially cylindrical form having an open segment, bonding into the so formed strap and in the open segment thereof a segment having a bar-like portion disposed transversely of the strap with a part of the bar-like portion extending substantially above the outer peripheral surface of the strap, effecting an opening through the strap on one side of the said bar-like portion with the ends of the opening terminating inwardly of opposite edges of the strap, effecting other openings through the strap on the opposite side of the said bar-like portion extending inwardly from each of opposite edges of the strap with the inner ends of the respective openings disposed substantially in linear alignment with the respective opposite ends of the first mentioned opening, and severing the strap longitudinally around its periphery linearly with each of the ends of said first mentioned opening and with the respective linearly aligned ends of the second mentioned openings from the said first opening to the said second openings whereby to form a central circular ribbon connected at one end only to one side of the bar-like portion and outer ribbons each connected at one end only to the opposite side of the bar-like portion.

2. A method in accordance with claim 1 in which the severing of the strap is occasioned completely around the periphery of the strap and through the segment to a depth at least equivalent to the cross sectional thickness of the strap.

3. The method of manufacturing a brake band adapted for double encirclement of a drum in the same direction of rotation wherein the band includes a cylindrical central ribbon disposed between coextensively extending cylindrical outer ribbons with one end of the central ribbon unitized with one side of an inflexible connecting bar and the opposite side of the central ribbon disconnected from the bar and one end of each of the outer ribbons unitized with the side of the bar from which the central ribbon is disconnected and the opposite end disconnected from the side of the bar with which the central ribbon is connected, said method comprising, arranging a metal strap into a cylindrical form having an open peripheral segment, bonding in the periphery of the formed strap and in the open segment a preformed segment having a raised bar-like boss disposed transversely of the strap substantially above the outer peripheral surface of the strap, effecting an opening through the strap on one side of the boss with the ends of the opening terminating inwardly of opposite edges of the strap, effecting other openings through the strap on the opposite side of the boss extending inwardly from each of opposite edges of the strap with the inner ends of the respective openings disposed substantially in linear alignment with the respective opposite ends of the first mentioned opening, and severing the strap longitudinally around its periphery linearly with each of the ends of said first mentioned opening and with the respective linearly aligned ends of the second mentioned openings from the said first opening to the said second openings whereby to form a central circular ribbon connected at one end only to one side of the boss and outer ribbons each connected at one end only to the opposite side of the boss 4. A method of manufacturing a brake band in accordance with claim 3 in which the preformed segment extends a substantial distance around the periphery of the band on each side of the bar-like boss and the effected openings are disposed in the segment on opposite sides of the bar-like boss.

5. The method of manufacturing a brake band adapted for double encirclement of a drum in the same direction of rotation wherein the band includes a cylindrical central ribbon disposed between coextensively extending cylindrical outer ribbons with one end of the central ribbon unitized with one side of an inflexible connecting bar and the opposite side of the central ribbon disconnected from the bar and one end of each of the outer ribbons unitized with the side of the bar from which the central ribbon is disconnected and the opposite end disconnected from the side of the bar with which the central ribbon is connected, said method comprising, arranging a metal strap into a substantially cylindrical form having an open segment, bonding to the formed strap and in the open segment thereof a preformed segment having a raised portion substantially above the outer peripheral surface of the strap and including a bar-like boss disposed transversely of the strap and substantially above the outer peripheral surface of the segment, effecting a groove in the segment at each side of the bar-like strap transversely of the strap and of a depth to place the bottom of the groove substantially peripherally aligned with the outer periphery of the strap, effecting an opening through the segment in the groove on one side of the boss with the ends of the opening terminating inwardly of opposite edges of the segment, effecting other openings through the segment in the groove on the opposite side of the boss extending inwardly from each of opposite edges of the segment with the inner ends of the respective other openings disposed substantially linearly with the respective opposite ends of the first mentioned opening, and severing the strap longitudinally around its periphery sublinearly with each of the ends of said first mentioned opening and with the respective linearly aligned ends of the second mentioned openings from the said first opening to the said second openings whereby to form a central circular ribbon connected at one end only to one side of the boss and outer ribbons each connected at one end only to the opposite side of the boss.

6. The method of manufacturing a brake band adapted for double encirclement of a drum in the same direction of rotation wherein the band includes a cylindrical central ribbon disposed between coextensively extending cylindrical outer ribbons with one end of the central ribbon unitized with one side of an inflexible connecting bar and the opposite side of the central ribbon disconnected from the bar and one end of each of the outer ribbons unitized with the side of the bar from which the central ribbon is disconnected and the opposite end disconnected from the side of the bar with which the central ribbon is connected, said method comprising, arranging a metal strap into a substantially cylindrical form having an open segment, bonding to the formed strap and in the open segment a preformed segment having a raised portion substantially above the outer peripheral surface of the strap and including a bar-like boss disposed transversely of the strap and substantially above the outer peripheral surface of the segment, effecting a groove in the segment at each side of the bar-like strap transversely of the strap and of a depth to place the bottom of the groove substantially peripherally aligned with the outer periphery of the strap, effecting an opening through the segment in the groove on one side of the boss with the ends of the opening terminating inwardly of opposite edges of the segment, effecting other openings through the segment in the groove on the opposite side of the boss extending inwardly from each of opposite edges of the segment with the inner ends of the respective other openings disposed substantially linearly with the respectively opposite ends of the first mentioned opening, bonding to the inner periphery of the strap and segment a friction lining, effecting openings in the friction lining coextensive with the openings in the segment, and severing the strap longitudinally around its periphery linearly with each of the ends of said first mentioned opening and with the respective linearly aligned ends of the second mentioned openings from the said first opening to the said second openings whereby to form a central circular ribbon connected at one end only to one side of the boss and outer ribbons each connected at one end only to the opposite side of the boss.

7. A method in accordance with claim 6 in which the severing of the strap is occasioned completely around the periphery of the strap and through the segment to a depth at least equivalent to the cross sectional thickness of the strap and lining.

8. The method of manufacturing a brake band adapted for double encirclement of a drum in the same direction of rotation wherein the band includes a cylindrical central ribbon disposed between coextensively extending cylindrical outer ribbons with one end of the central ribbon unitized with one side of an inflexible connecting bar and the opposite side of the central ribbon disconnected from the bar and one end of each of the outer ribbons unitized with the side of the bar from which the central ribbon is disconnected and the opposite end disconnected from the side of the bar with which the central ribbon is connected, said method comprising, arranging a metal strap into a cylindrical form having an open segment, bonding in the periphery of the formed strap and in the open segment thereof a preformed segment having an inner periphery that effects a continuous peripheral extension of the inner periphery of the strap and an outer periphery providing a raised bar-like boss disposed transversely of the segment and strap substantially above the outer peripheral surface of the strap with the segment extending on opposite sides of the bar-like boss a substantial distance of a thickness substantially the same as the cross sectional thickness of the strap, effecting an opening through the segment on one side of the boss with the ends of the opening terminating inwardly of opposite edges of the segment, effecting other openings through the segment on the opposite side of the boss extending inwardly from each of opposite edges of the strap with the inner ends of the respective other openings disposed substantially linearly with respective opposite ends of the first mentioned opening, and severing the strap longitudinally around its periphery linearly with each of the ends of said first mentioned opening and with the respective linearly aligned ends of the second mentioned openings from the said first opening to the said second openings whereby to form a central circular ribbon connected at one end only to one side of the boss and outer ribbons each connected at one end only to the opposite side of the boss.

9. The method of manufacturing a brake band adapted for double encirclement of a drum in the same direction of rotation wherein the band includes a cylindrical central ribbon disposed between coextensively extending cylindrical outer ribbons with one end of the central ribbon unitized with one side of an inflexible connecting bar and the opposite side of the central ribbon disconnected from the bar and one end of each of the outer ribbons unitized with the side of the bar from which the central ribbon is disconnected and the opposite end disconnected from the side of the bar with which the central ribbon is connected, said method comprising, arranging a metal strap into a cylindrical form having an open segment, bonding in the periphery of the formed strap and in the open segment thereof a preformed segment having an inner periphery that effects a continuous peripheral extension of the inner periphery of the strap and an outer periphery providing a raised bar-like boss disposed transversely of the segment and strap substantially above the outer peripheral surface of the strap with the segment extending on opposite sides of the bar-like boss a substantial distance of a thickness substantially the same as the cross sectional thickness of the strap, and including other raised bosses on one side of the first mentioned boss at each of opposite ends of the first boss and another raised boss on the opposite side of the first mentioned boss intermediate the ends thereof, effecting a groove on each of opposite sides of the first mentioned boss transversely of the segment and through said last mentioned bosses to a depth at which the bottom of the groove is substantially in peripheral alignment with the periphery of the strap, effecting an opening in the groove through the segment on one side of the said first mentioned boss with the ends of the opening terminating inwardly of opposite edges of the segment, effecting other openings in the groove on the opposite side of the boss and through the segment and extending inwardly from each of opposite edges of the segment with the inner ends of the said other openings disposed substantially linearly with opposite ends of the first mentioned opening, and severing the strap longitudinally around its periphery linearly with each of the ends of said first mentioned opening and with the respective linearly aligned ends of the second mentioned openings from the said first opening to the said second openings whereby to form a central circular ribbon connected at one end only to one side of the boss and outer ribbons each connected at one end only to the opposite side of the boss.

10. The method in accordance with claim 9 in which after the openings are effected in the segment friction lining is bonded to the inner periphery of the strap and segment and thereafter openings are effected in the friction lining that are coextensive with the openings in the segment.

References Cited in the file of this patent

UNITED STATES PATENTS

| | | |
|---|---|---|
| 1,405,601 | Libby | Feb. 7, 1922 |
| 2,143,458 | Sinclair | Jan. 10, 1939 |
| 2,637,420 | Churchill | May 5, 1953 |
| 2,692,663 | Reed et al. | Oct. 26, 1954 |
| 2,693,021 | Sinclair et al. | Nov. 2, 1954 |
| 2,768,714 | Holdeman et al. | Oct. 30, 1956 |